(12) United States Patent
Nishiguchi

(10) Patent No.: US 11,178,343 B2
(45) Date of Patent: Nov. 16, 2021

(54) COMBINING IMAGES FROM DIFFERENT DEVICES ACCORDING TO A DETERMINED WIPE SHAPE

(71) Applicant: CANON KABUSHIKI KAISHA, Tokyo (JP)

(72) Inventor: Tatsuya Nishiguchi, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/392,273

(22) Filed: Apr. 23, 2019

(65) Prior Publication Data
US 2019/0335097 A1  Oct. 31, 2019

(30) Foreign Application Priority Data
Apr. 27, 2018  (JP) .............................. JP2018-086423

(51) Int. Cl.
| | |
|---|---|
| *H04N 5/262* | (2006.01) |
| *H04N 5/232* | (2006.01) |
| *H04N 5/265* | (2006.01) |
| *H04N 5/272* | (2006.01) |
| *H04N 1/00* | (2006.01) |
| *H04N 101/00* | (2006.01) |

(52) U.S. Cl.
CPC ....... *H04N 5/2621* (2013.01); *H04N 1/00251* (2013.01); *H04N 5/23229* (2013.01); *H04N 5/232939* (2018.08); *H04N 5/265* (2013.01); *H04N 5/272* (2013.01); *H04N 1/00307* (2013.01); *H04N 2101/00* (2013.01); *H04N 2201/0084* (2013.01)

(58) Field of Classification Search
CPC ...... H04N 5/2621; H04N 5/265; H04N 5/272; H04N 5/23206; H04N 5/232061; H04N 1/00127; H04N 1/00251; H04N 1/00307; H04N 2201/0084; H04N 5/2628; H04N 1/00132–00201; H04N 1/00148–00156; H04N 1/00167–00177; H04N 1/0204–00217; H04N 1/00244; H04N 1/00249–00251; H04N 1/00347; G06F 16/53–532
See application file for complete search history.

(56) References Cited

U.S. PATENT DOCUMENTS

| | | | |
|---|---|---|---|
| 6,621,524 B1 * | 9/2003 | Iijima ................... | H04N 5/262 348/584 |
| 2006/0044396 A1 * | 3/2006 | Miyashita ............ | H04N 5/2252 348/207.99 |
| 2006/0140508 A1 * | 6/2006 | Ohgishi ................... | G06T 1/00 382/284 |
| 2009/0257730 A1 * | 10/2009 | Chen .................... | G11B 27/034 386/278 |

(Continued)

FOREIGN PATENT DOCUMENTS

JP    H6-165029 A    6/1994

*Primary Examiner* — Paul M Berardesca
(74) *Attorney, Agent, or Firm* — Canon U.S.A., Inc. IP Division

(57) ABSTRACT

An image processing apparatus that communicates with an external device and combines a sub image received from the external device with a main image includes a determination unit that determines a wipe shape of the sub image, and a notification unit that notifies the external device of the determined wipe shape.

15 Claims, 13 Drawing Sheets

(56) References Cited

U.S. PATENT DOCUMENTS

| | | | | |
|---|---|---|---|---|
| 2015/0181113 A1* | 6/2015 | Kiura | ................ | H04N 5/23222 |
| | | | | 348/207.1 |
| 2015/0304588 A1* | 10/2015 | Jung | ..................... | G06F 16/51 |
| | | | | 348/552 |
| 2017/0289427 A1* | 10/2017 | Eum | ................. | H04N 5/23206 |
| 2019/0045109 A1* | 2/2019 | Takami | ................ | H04N 5/272 |
| 2019/0335112 A1* | 10/2019 | Iko | .................. | H04N 5/232939 |

\* cited by examiner

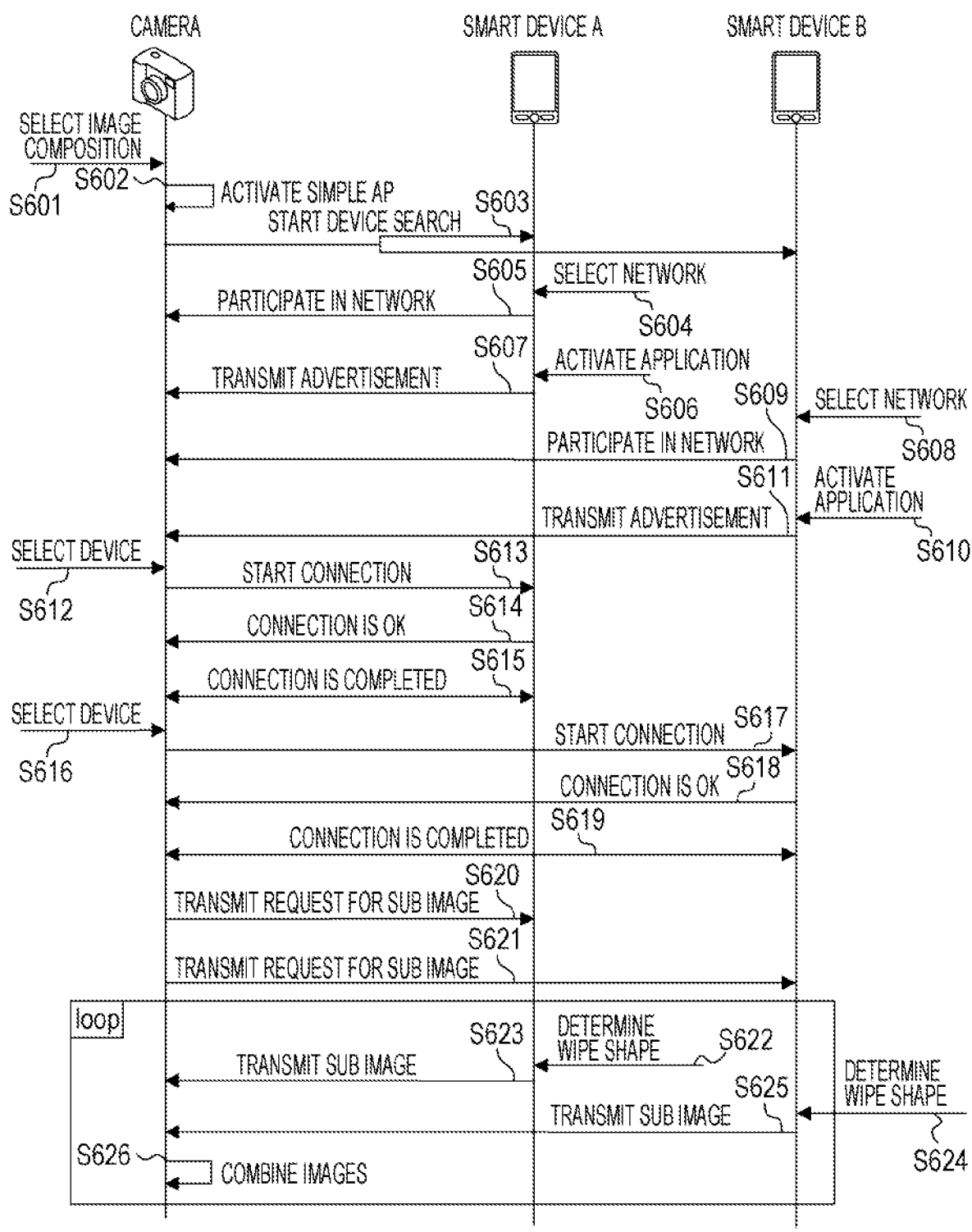

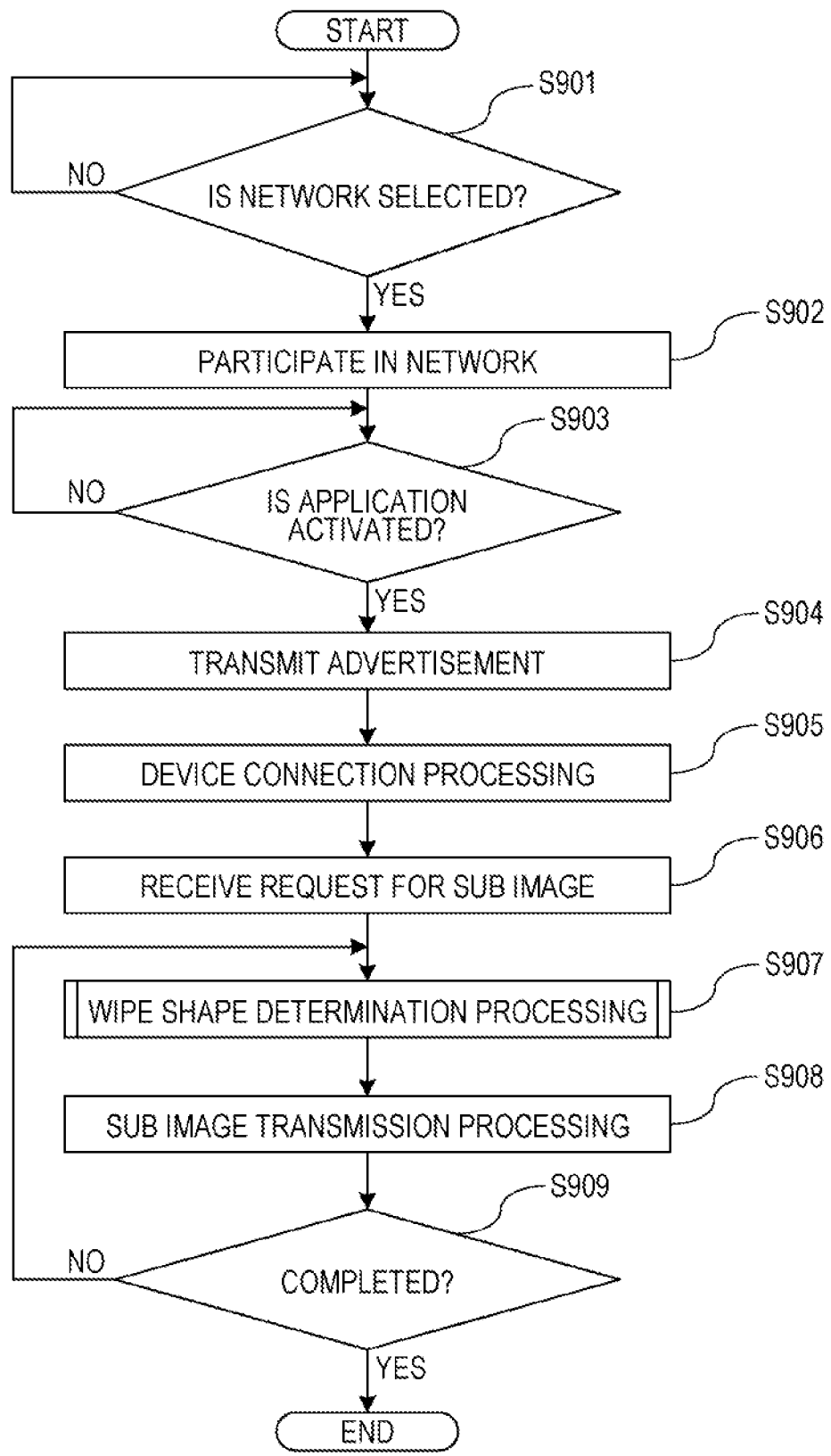

COMBINING IMAGES FROM DIFFERENT DEVICES ACCORDING TO A DETERMINED WIPE SHAPE

BACKGROUND

Field

The present disclosure relates to an image processing apparatus wirelessly communicating with an external device, an electronic device, a control method thereof, and a recording medium.

Description of the Related Art

Some imaging apparatuses such as digital cameras have a wireless communication function to perform transmission and reception of image data with external devices. In addition, some imaging apparatuses have a function of receiving an image captured by an external device and combining it with an image captured by itself. For example, Japanese Patent Laid-Open No. 6-165029 discloses a technique of combining a first video signal as an output of a first imaging unit and a second video signal as an output of a second imaging unit to than a third video signal.

In the conventional technique disclosed in Japanese Patent Laid-Open No. 6-165029, a sub image is superimposed on a main image and displayed in a separate screen like a small window (referred to as a wipe in the present application).

Japanese Patent Laid-Open No. 6-165029 is not seen to discuss the wipe shape, and the sub image is always displayed in the wipe of the same shape. That is, there is no description of changing the wipe to a different shape.

SUMMARY

According to an aspect of the present disclosure, an image processing apparatus that communicates with an external device and combines a sub image received from the external device with a main image includes a determination unit configured to determine a wipe shape of the sub image, and a notification unit configured to notify the external device of the determined wipe shape.

Further features will become apparent from the following description of exemplary embodiments with reference to the attached drawings.

BRIEF DESCRIPTION OF THE DRAWINGS

FIG. 6 is a sequence diagram illustrating processing by a digital camera and a smart device according to a second exemplary embodiment.

FIG. 9A is a flowchart describing the operations of the smart device according to the second exemplary embodiment.

DESCRIPTION OF THE EMBODIMENTS

Exemplary embodiments will be described with reference to the accompanying drawings.

First Exemplary Embodiment

[Configuration of a Digital Camera 100]

Figure 1A:
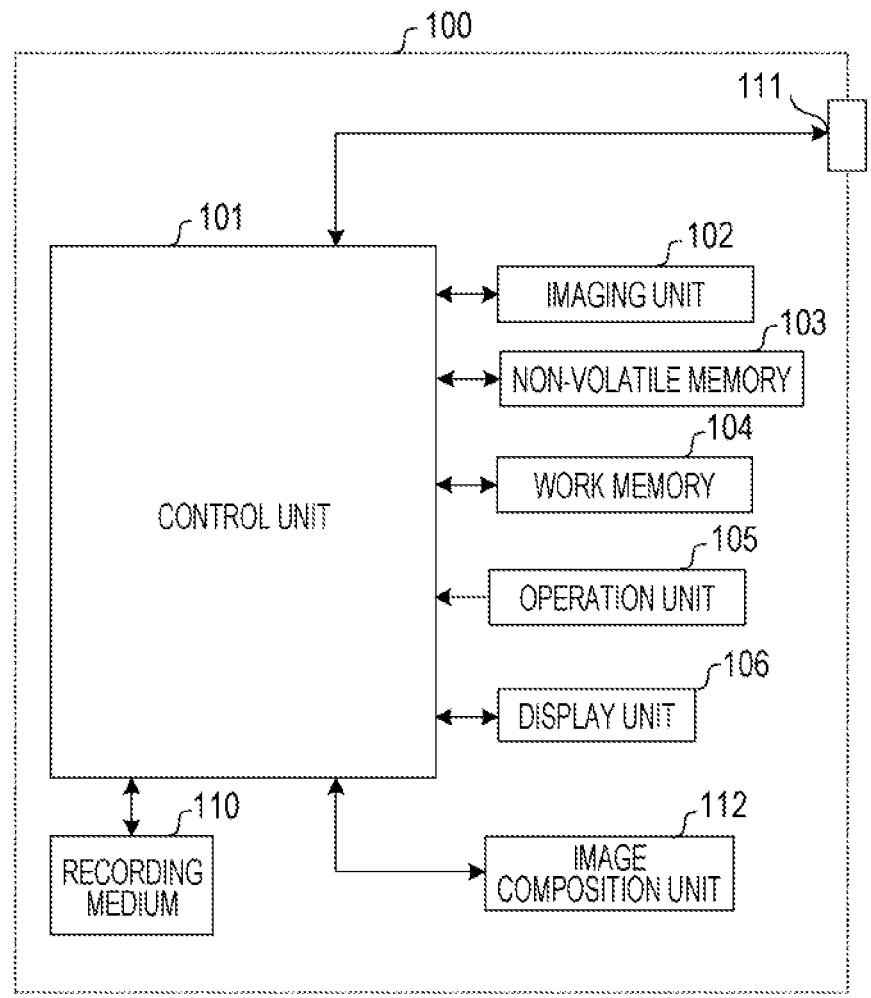
FIGS. 1A to 1C are diagrams illustrating a configuration example of a digital camera according to a first exemplary embodiment.
Figure 1B:
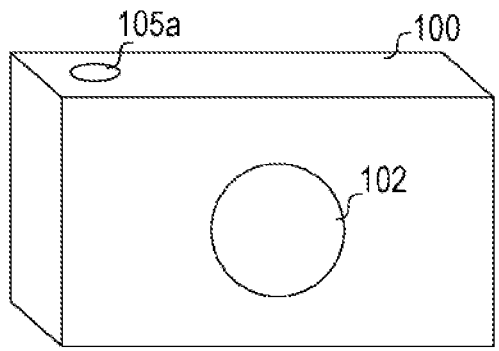
Figure 1C:
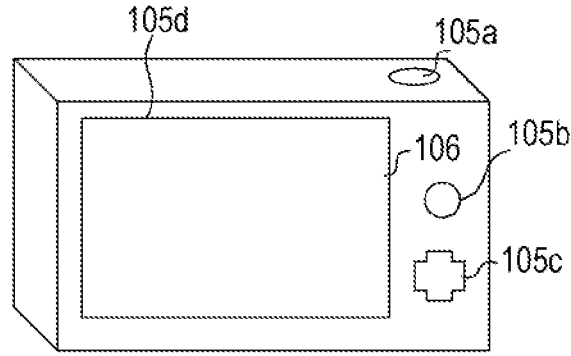

FIGS. 1A to 1C are diagrams illustrating a configuration example of the digital camera 100 according to the present exemplary embodiment. The digital camera 100 is an example of an image processing apparatus according to the exemplary embodiment.

FIG. 1A is a block diagram illustrating a configuration example of the digital camera 100.

A control unit 101 controls individual units of the digital camera 100 according to input signals and programs. The control unit 101 may not control entire apparatus but a plurality of pieces of hardware may share processing to control the entire apparatus.

An imaging unit 102 includes, for example, an optical system that controls an optical lens unit, diaphragm, zoom, and focus, an imaging element that converts light (video image) introduced through the optical lens unit into an electrical video signal, and others. In general, the imaging element is a complementary metal oxide semiconductor (CMOS) or a charge coupled device (CCD). Under the control of the control unit 101, the imaging unit 102 converts subject light imaged by a lens included in the imaging unit 102 into an electric signal by the imaging element, subjects the electric signal to noise reduction processing, and outputs the digital data as image data. The image data is recorded on a recording medium 110 according to the standards of design rule for camera file (DCF) system, for example, or is combined with another image by an image composition unit 112.

A non-volatile memory 103 is a non-volatile memory that can electrically erase and record, and stores programs to be executed by the control unit 101.

A work memory 104 is used as a buffer memory that temporarily holds image data captured by the imaging unit 102, an image display memory for a display unit 106, a work area for the control unit 101, and the like.

An operation unit 105 is used to receive an instruction from the user to the digital camera 100. The operation unit 105 includes, for example, a power button for instructing powering on/off of the digital camera 100, a release switch for instructing photographing, and a reproduction button for instructing reproduction of image data. The operation unit 105 also includes a connection button for starting communication with an external device via a connection unit 111. The operation unit 105 also includes a touch panel formed on the display unit 106. The release switch has a SW 1 and a SW 2. When the release switch becomes in a half-stroke state, the SW 1 is turned on. Accordingly, instructions for preparing for photographing such as autofocus (AF) processing, automatic exposure (AE) processing, auto white balance (AWB) processing, and pre-flash (EF) processing are accepted. When the release switch becomes in a full-stroke state, the SW 2 is turned on. Accordingly, an instruction for photographing is accepted.

The display unit 106 displays a viewfinder image at the time of photographing, captured image data, characters for interactive operations, and others. The digital camera 100 does not necessarily need to include the display unit 106. The digital camera 100 has merely a display control function of connecting to the internal or external display unit 106 to control display on the display unit 106.

The recording medium 110 records the image data output from the imaging unit 102 and the image data combined by the image composition unit 112. The recording medium 110 may be detachably attached to the digital camera 100 or may be configured to be built in the digital camera 100. That is, the digital camera 100 has merely a function of accessing the recording medium 110.

The connection unit 111 is an interface for connecting to an external device. The digital camera 100 can exchange data with an external device via the connection unit 111. For example, the digital camera 100 can receive image data generated by an external device from the external device via the connection unit 111. The connection unit 111 includes, for example, an interface for communicating with an external device in a wireless LAN according to the IEEE 802.11 standard. The control unit 101 implements wireless communication with an external device by controlling the connection unit 111. The communication method is not limited to the wireless LAN, and other wireless communication methods such as an infrared communication method, Bluetooth®, wireless USB or the like may be used.

The image composition unit 112 can combine two or more images. For example, the image composition unit 112 combines the image output from the imaging unit 102 and the image received from an external device via the connection unit 111 to generate and output one image data. Specifically, assuming that the image output from the imaging unit 102 is a main image and the image received from the external device is a sub-image, the image composition unit 112 can superimpose the sub image on the main image so that the sub image is displayed in a wipe. The image data output from the image composition unit 112 is recorded on the recording medium 110 according to the DCF standard.

The digital camera 100 according to the present exemplary embodiment has an AP mode in which to operate as an access point in an infrastructure mode and a CL mode in which to operate as a client in the infrastructure mode. By operating the connection unit 111 in the CL mode under the control of the control unit 101, the digital camera 100 can operate as a CL device in the infrastructure mode. When the digital camera 100 operates as a CL device, the digital camera 100 can connect to a peripheral AP device participate in the network formed by the AP device. By operating the connection unit 111 in the AP mode under the control of the control unit 101, the digital camera 100 can operate as a kind of AP but as a simple AP with more limited functions (hereinafter referred to as "simple AP"). When the digital camera 100 operates as a simple AP, the digital camera 100 forms a network by itself. Peripheral devices of the digital camera 100 can recognize the digital camera 100 as an AP device and participate in the network formed by the digital camera 100. Programs for operating the digital camera 100 in this way are held in the non-volatile memory 103. Although the digital camera 100 according to the present exemplary embodiment is a type of AP but a simple AP that does not have a gateway function of transferring data received from a CL device to an Internet provider or the like. Therefore, even when receiving data from peripheral devices participating in the network formed by itself, the digital camera 100 cannot transfer the data to a network such as the Internet.

Next, FIGS. 1B and 1C are diagrams illustrating an external appearance example of the digital camera 100. A release switch 105*a*, a reproduction button 105*b*, a direction key 105*c*, a touch panel 105*d*, and others are examples of operation members constituting the operation unit 105 and are disposed at appropriate positions of the digital camera 100. The display unit 106 is disposed on the back of the digital camera 100.

The digital camera 100 has been described as an example of the image processing apparatus in the present exemplary embodiment, but the image processing apparatus is not limited thereto. For example, the image processing apparatus can be an information processing apparatus such as a mobile phone, a portable media player, a tablet device, or a personal computer.

[Configuration of a Smart Device 200]

Figure 2:
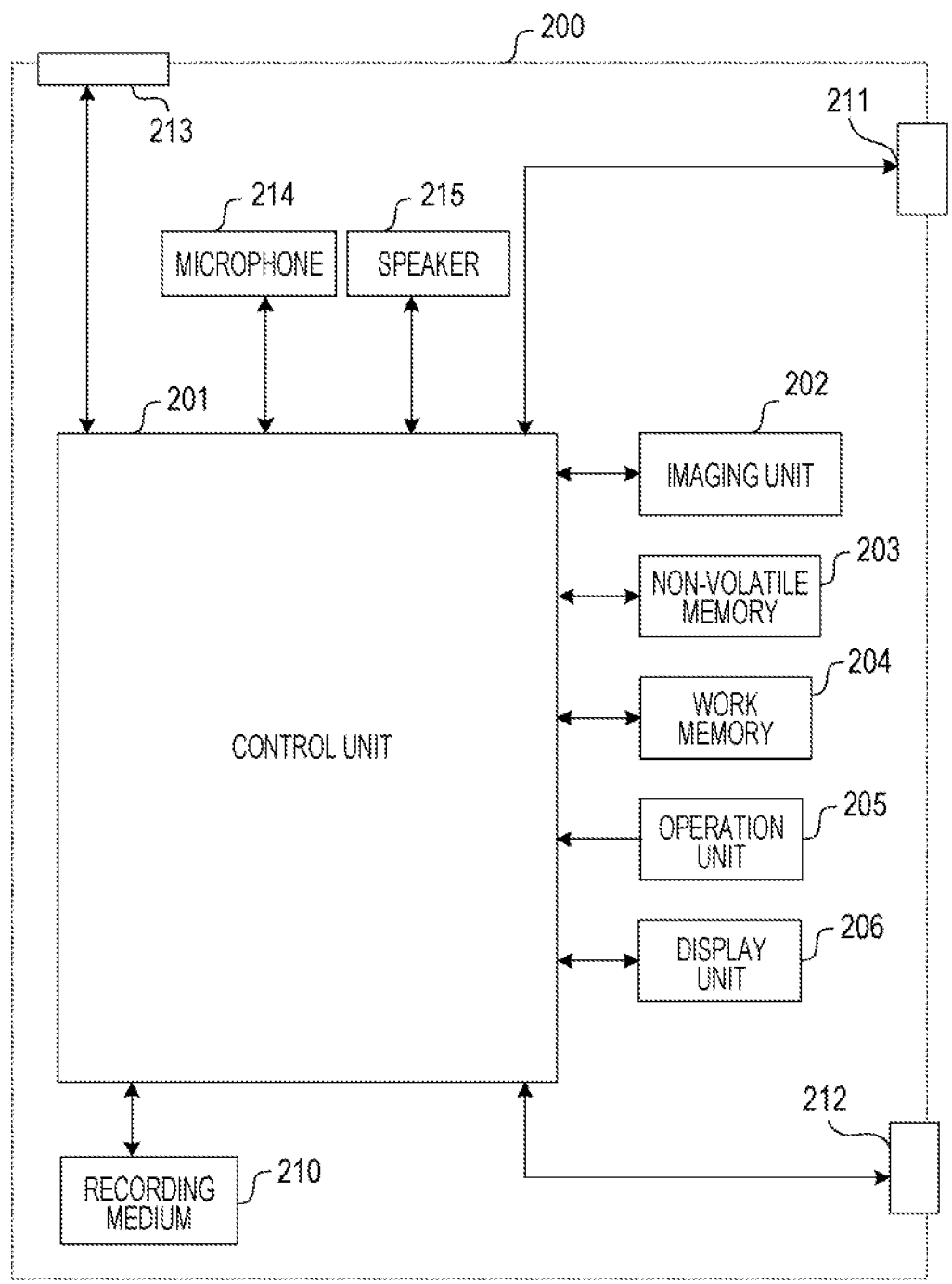
FIG. 2 is a diagram illustrating a configuration example of a smart device according to the first exemplary embodiment.

FIG. 2 is a diagram illustrating a configuration example of a smart device 200 according to the present exemplary embodiment. The smart device 200 is an example of an electronic device in the present exemplary embodiment, and serves as an external device for the digital camera 100. The smart device includes a mobile phone such as a smartphone or a tablet device.

A control unit 201 controls individual units of the smart device 200 according to input signals and programs. The control unit 201 may not control the entire apparatus but a plurality of pieces of hardware may share processing to control the entire apparatus.

Under the control of the control unit 201, an imaging unit 202 converts subject light imaged by a lens included in the imaging unit 202 into an electric signal by an imaging element, subjects the electric signal to noise reduction processing, and outputs the digital data as image data. After the image data is stored in a buffer memory, the control unit 201 executes a predetermined calculation and records the image data on a recording medium 210 or transmits the image data to an external device via a connection unit 211.

A non-volatile memory 203 is a non-volatile memory that can electrically erase and record. The non-volatile memory 203 records an operating system (OS) as basic software to be executed by the control unit 201 and applications which implement applicative functions in cooperation with this OS. The non-volatile memory 203 also stores an application for communicating with the digital camera 100.

A work memory 204 is used as an image display memory for the display unit 206, a work area for the control unit 201, and the like.

An operation unit 205 is used to receive instructions from the user to the smart device 200. The operation unit 205 includes, for example, a power button for instructing powering on/off of the smart device 200, and a touch panel formed on a display unit 206.

The display unit 206 displays image data, characters for interactive operations, and the like. The smart device 200 does not necessarily need to include the display unit 206.

The smart device 200 has merely a display control function of connecting to the internal or external display unit 206 and controlling display on the display unit 206.

The recording medium 210 records the image data output from the imaging unit 202. The recording medium 210 may be detachably attached to the smart device 200 or may be built in the smart device 200. That is, the smart device 200 has merely a function of accessing the recording medium 210.

The connection unit 211 is an interface for connecting to an external device. The smart device 200 can exchange data with an external device via the connection unit 211. In the present exemplary embodiment, the connection unit 211 is an antenna, and the control unit 201 can be connected to the digital camera 100 via the antenna. The connection unit 211 may be directly connected to the digital camera 100 or may be connected to the digital camera 100 via an access point. As a protocol for data communication, Picture Transfer Protocol over Internet Protocol (PTP/IP) through a wireless LAN can be used, for example. Note that the communication with the digital camera 100 is not limited to this. For example, the connection unit 211 may be another wireless communication module such as an infrared communication module, a Bluetooth® communication module, or a wireless USB.

A near field radio communication unit 212 is a communication unit for implementing near field radio communication. The near field radio communication unit 212 is formed from an antenna for wireless communication, a modulation/demodulation circuit for processing radio signals, and a communication controller. The near field radio communication unit 212 outputs a modulated radio signal from the antenna and demodulates a radio signal received by the antenna, thereby implementing near field radio communication. In this case, near field radio communication is implemented in conformity with the IEEE 802.15 standard (Bluetooth®). Note that the non-contact proximity communication implemented by the near field radio communication unit 212 is not limited to Bluetooth®, and other wireless communication may be adopted.

A public network connection unit 213 is an interface used for performing public wireless communication. The smart device 200 can make a telephone call to another device via the public network connection unit 213. At this time, the control unit 201 implements the telephone call by inputting and outputting sound signals via a microphone 214 and a speaker 215. In the present exemplary embodiment, the public network connection unit 213 is an antenna, and the control unit 201 can connect to the public network via the antenna. One antenna can serve as both the connection unit 211 and the public network connection unit 213.

The smart device 200 has been described as an example of the electronic device in the present exemplary embodiment, but the electronic device is not limited thereto. For example, the electronic device can be a digital camera with a wireless function or an information processing apparatus such as a personal computer.

[About Image Composition]

Next, a process of combining a main image output from the imaging unit 102 and a sub image received from the smart device 200 in the digital camera 100 will be described with reference to FIGS. 3, 4A, and 4B.

Figure 3:
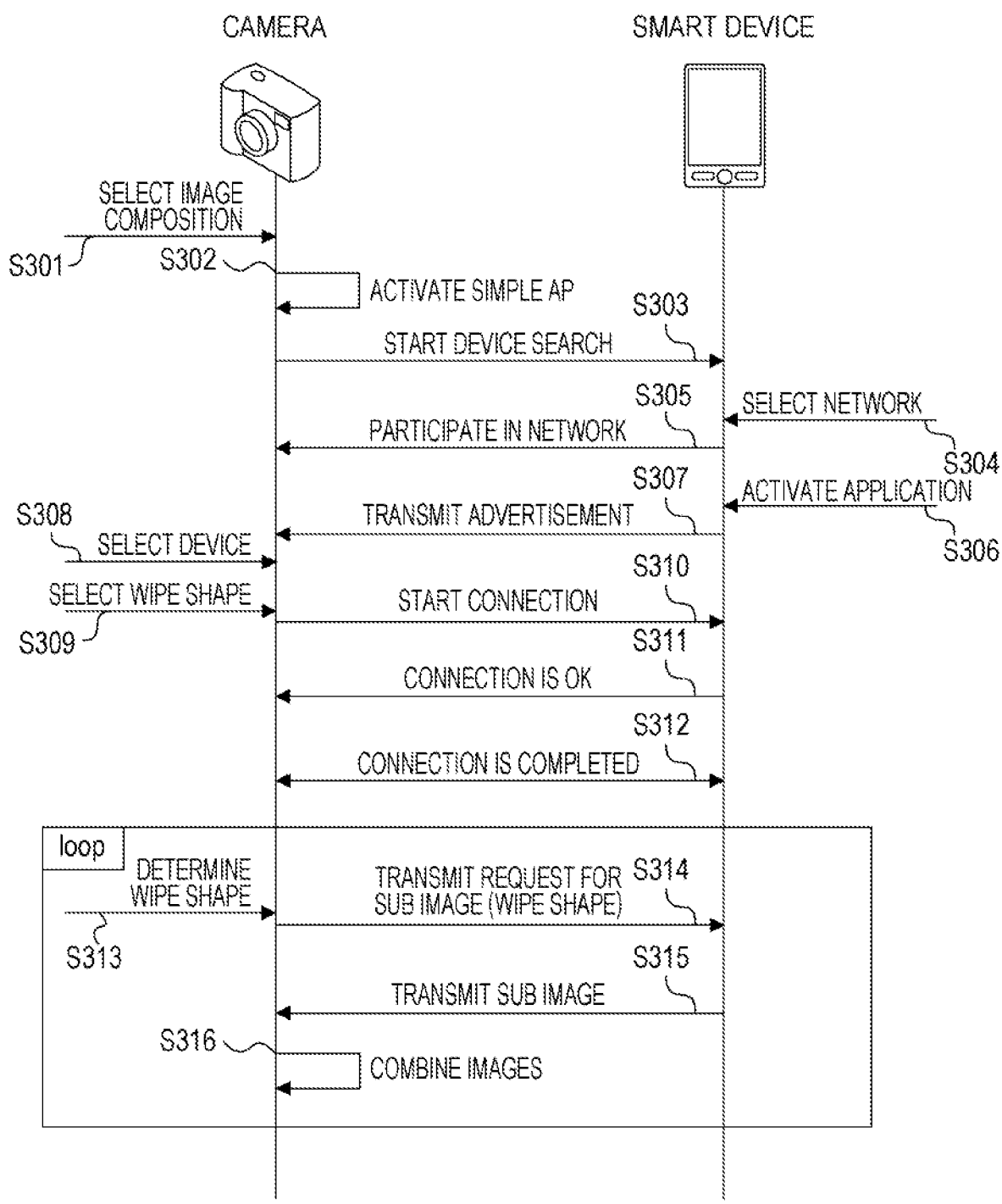
FIG. 3 is a sequence diagram illustrating processing by the digital camera and the smart device according to the first exemplary embodiment.

FIG. 3 is a sequence diagram illustrating processing by the digital camera 100 and the smart device 200 according to the first exemplary embodiment.

Figure 4A:
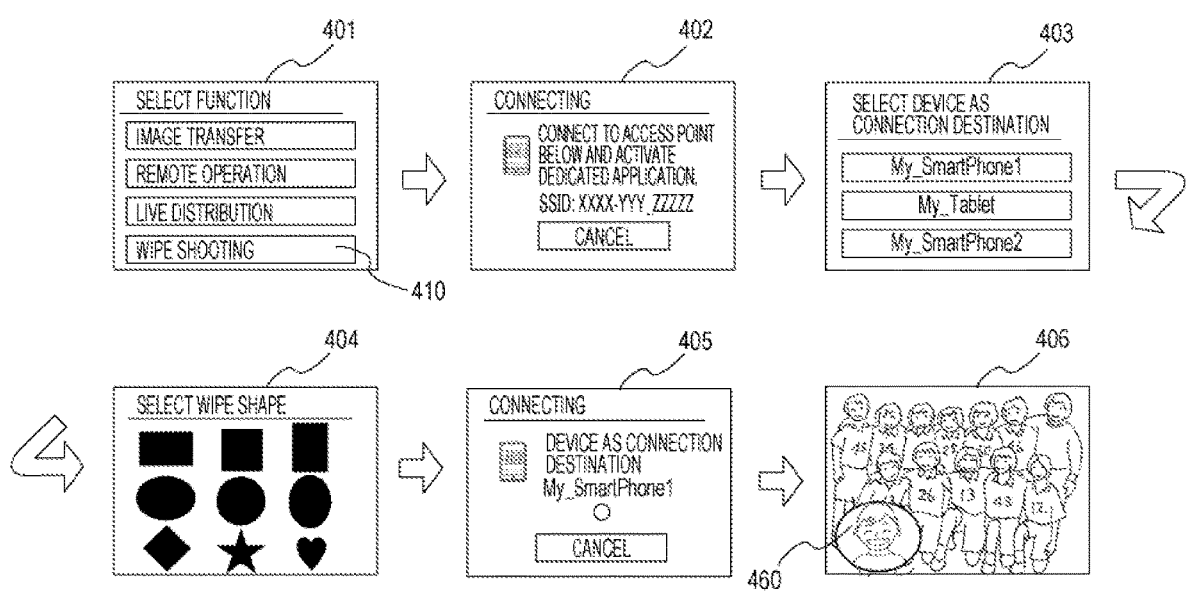
FIGS. 4A and 4B are diagrams illustrating examples of screens displayed on a display unit of the digital camera and a display unit of the smart device according to the first exemplary embodiment.
Figure 4B:
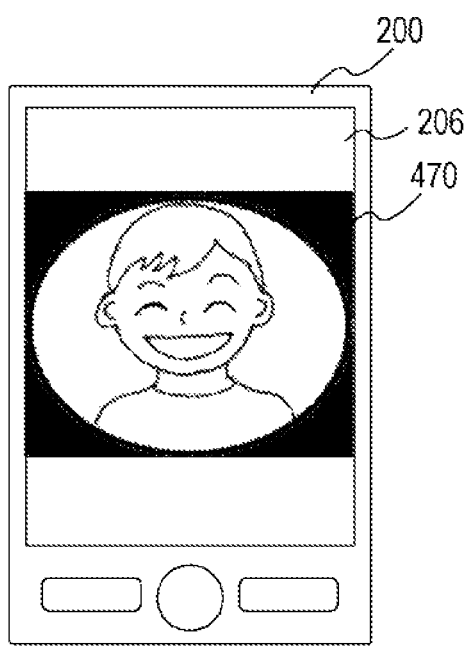

FIG. 4A is a diagram illustrating an example of screen transition on the display unit 106 at the time of combining the main image output from the imaging unit 102 and the sub image received from the smart device 200 in the digital camera 100. FIG. 4B is a diagram illustrating an example in which, in the smart device 200, a shooting screen 470 is set based on the shape of a wipe received from the digital camera 100 and displayed on the display unit 206.

In step S301, the control unit 101 of the digital camera 100 displays a function selection screen 401 illustrated in FIG. 4A on the display unit 106. On the function selection screen 401, a wipe shooting button 410 for selecting the function of combining the main image and the sub image is displayed. The user can select the function of combining the main image and the sub image by operating the operation unit 105 (for example, the touch panel) and selecting the wipe shooting button 410. On the function selection screen 401, buttons for executing other communication functions are also displayed. For example, an image transfer button for selecting a function to transfer image data to an external device, a remote operation button for selecting a function to remotely operate the digital camera 100 from an external device are displayed.

Upon detecting the selection of the wipe shooting button 410, the control unit 101 starts the processing in step S302 and subsequent steps to performs a process for wireless LAN connection. For example, Wi-Fi® can be used as a wireless LAN standard.

In step S302, the control unit 101 of the digital camera 100 activates the simple AP to generate a wireless LAN network, and displays a screen 402 illustrated in FIG. 4A on the display unit 106. On the screen 402, at least a service set identifier (SSID) as a network identifier is displayed so that peripheral devices can participate in the wireless LAN network. In addition, when the wireless LAN network is under security using an encryption key, the encryption key may also be displayed.

In step S303, the control unit 101 of the digital camera 100 starts device search. The device search can be performed by using a discovery protocol, for example, Single Service Discovery Protocol (SSDP), Malticast DNS, or the like.

In step S304, the control unit 201 of the smart device 200 performs network selection. The control unit 201 displays an SSID list display screen (not illustrated) on the display unit 206 and accepts a network selection of the simple AP generated by the digital camera 100 via the operation unit 205. The SSID list display screen can be displayed by selecting an option for inputting an instruction to start wireless LAN setting from the OS menu. The display unit 106 of the digital camera 100 displays the SSID of the network generated by the digital camera 100 as illustrated on the screen 402. The user can check the SSID displayed on the screen 402 and select the SSID of the network generated by the digital camera 100 from the SSID list displayed on the SSID list display screen.

When the network is selected by a user operation in step S304, the smart device 200 participates in the simple AP network of the digital camera 100 in step S305. When the smart device 200 participates in the network, IP address and the like are set, and a connection between the digital camera 100 and the smart device 200 is established at a network level.

Then, a connection is established at an application level by the subsequent processing. In step S306, the control unit 201 of the smart device 200 receives an instruction for activation of an application saved in the non-volatile memory 203 via the operation unit 205.

In step S307, the control unit 201 of the smart device 200 broadcasts an advertisement notification in the participating network according to the control of the activated application to notify its own presence to the digital camera 100. The advertisement notification can be made using a discovery protocol, for example, SSDP, Malticast DNS, or the like.

In step S308, the control unit 101 of the digital camera 100 selects the device to be connected. Upon reception of the advertisement notification in step S307, the control unit 101 displays a screen 403 illustrated in FIG. 4A on the display unit 106. On the screen 403, the device names included in the advertisement notification are displayed to show a list of connectable devices to the user. The user can operate the operation unit 105 to select the device to connect from the screen 403. In this example, it is assumed that the smart device 200 is selected.

In step S309, the control unit 101 of the digital camera 100 selects the wipe shape of the device to connect. The control unit 101 displays a wipe selection screen 404 illustrated in FIG. 4A on the display unit 106. On the wipe selection screen 404, a plurality of wipe shapes is presented in a selectable manner so that the user can operate the operation unit 105 to select a desired wipe shape.

In step S310, the control unit 101 of the digital camera 100 starts a process of connecting with the smart device 200 as the device to connect selected in step S308. In conjunction with this, the control unit 101 displays a screen 405 illustrated in FIG. 4A on the display unit 106.

In step S311, the control unit 201 of the smart device 200 notifies the digital camera 100 of whether connection is enabled or disabled. When connection is enabled, the smart device 200 notifies the digital camera 100 that connection is OK, and when the connection is disabled, the smart device 200 notifies the digital camera 100 that connection is NG.

In step S312, according to the notification in step S310, the application-level connection is completed between the digital camera 100 and the smart device 200.

In step S313, the control unit 101 of the digital camera 100 determines the wipe shape. When there is a request for changing the wipe shape by a user operation, the control unit 101 displays the wipe selection screen 404 illustrated in FIG. 4A on the display unit 106, so that the user can operates the operation unit 105 to select and determine the desired wipe shape. When there is no request for changing the wipe shape, the wipe shape at the present time, that is, the wipe shape selected in step S309 is maintained. When the wipe shape has been changed, the lastly changed wipe shape is maintained.

In step S314, the control unit 101 of the digital camera 100 transmits a sub image request including the notification of the wipe shape determined in step S313 to the smart device 200.

In step S315, the control unit 201 of the smart device 200 transmits the sub image data to the digital camera 100. As illustrated in FIG. 4B, the control unit 201 sets a shooting screen 470 for shooting by the imaging unit 202 and displays the same on the display unit 206. On the shooting screen 470, an area for displaying the image captured by the imaging unit 202 is provided to match the wipe shape received in step S314, and the other areas are blackened. In the present example, a horizontally long elliptical wipe on the left middle of the wipe selection screen 404 is determined. By setting the shooting screen according to the wipe shape in this way, the user can perform shooting with a consciousness about the wipe shape. Then, the control unit 201 transmits the image data output from the imaging unit 202 and adjusted based on the wipe shape as sub image data to the digital camera 100. Adjusting the image data based on the wipe shape refers to cutting out the image from the imaging unit 202 according to the wipe shape, for example.

In step S316, the control unit 101 of the digital camera 100 combines the main image output from the imaging unit 102 and the sub image received in step S315. As a result, the display unit 106 of the digital camera 100 displays the composite image such that the sub image is superimposed on the main image and is displayed in a wipe 460 as illustrated on the screen 406 in FIG. 4A. When shooting is performed in this state, the composite image data may be saved in the cording medium 110.

The digital camera 100 and the smart device 200 repeatedly execute the processing in steps S313 to S316.

As described above, in the digital camera 100, the main image output from the imaging unit 102 and the sub image received from the smart device 200 can be combined.

The wipes may be prepared in the same shape and different sizes, for example. In this case, even if wipe shapes of different sizes are selected, the wipes are regarded as having no change in shape.

[Operations of the Digital Camera 100]

Next, the operations of the digital camera 100 for implementing the foregoing procedure will be described.

Figure 5A:
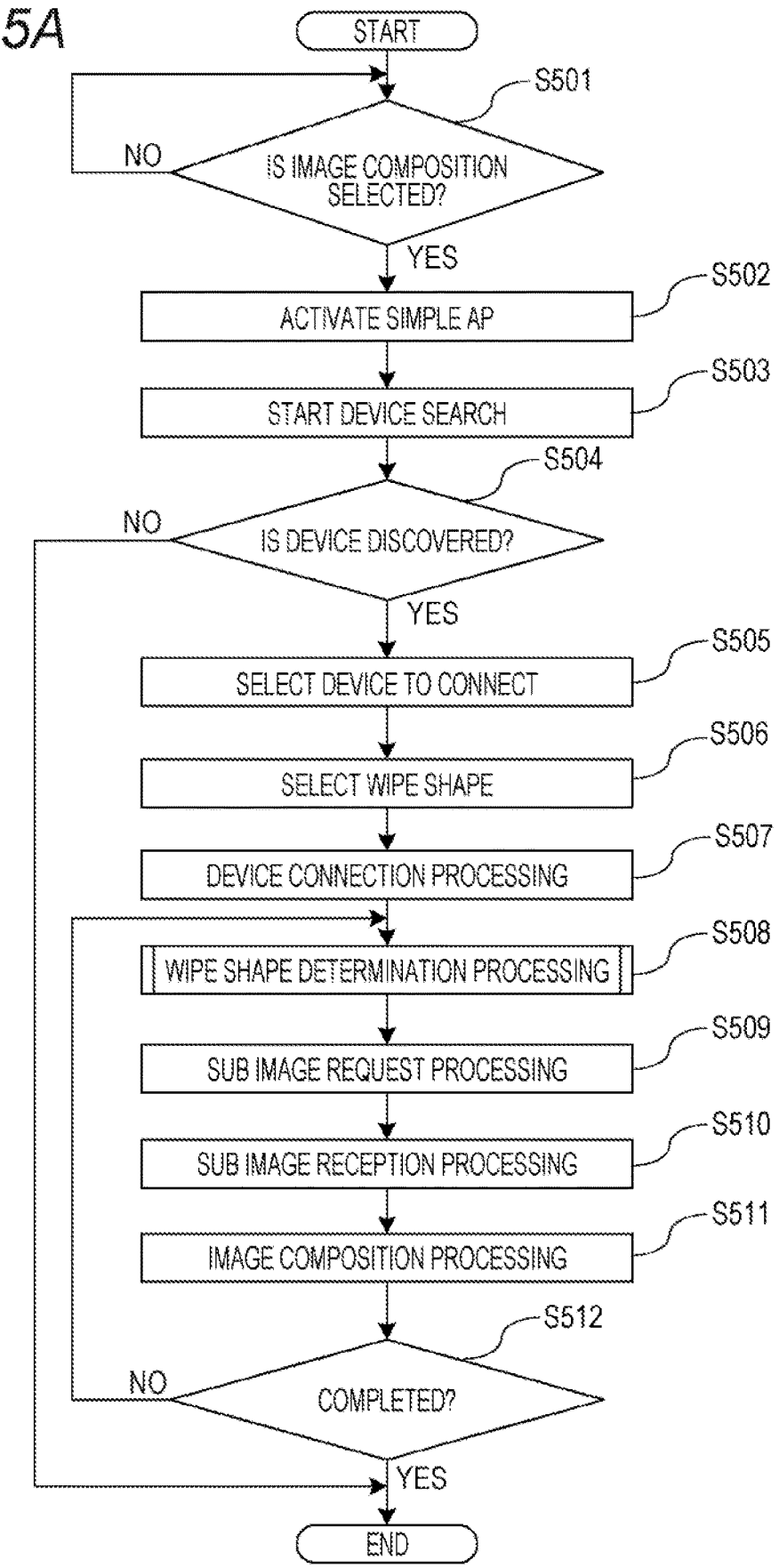
FIG. 5A is a flowchart describing the operations of the digital camera according to the first exemplary embodiment.

FIG. 5A is a flowchart illustrating the operations of the digital camera 100.

In step S501, the control unit 101 determines whether the function of combining the main image and the sub image has been selected. The processing in this step corresponds to step S301 of FIG. 3. When the control unit 101 determines that the image composition function has been selected, the process proceeds to step S502. Otherwise, the control unit 101 waits until the image composition function is selected.

In step S502, the control unit 101 activates the simple AP to generate a wireless LAN network. The processing in this step corresponds to step S302 of FIG. 3.

In step S503, the control unit 101 starts device search. The processing in this step corresponds to step S303 of FIG. 3.

In step S504, the control unit 101 determines whether any device has been discovered. When receiving the advertisement notification in step S307 of FIG. 3, the control unit 101 determines that any device has been discovered. When receiving no advertisement notification, the control unit 101 determines that no device has been discovered. In this step, it may be determined that no device has been discovered when no advertisement notification has been received for a predetermined time. When the control unit 101 determines that any device has been discovered, the process proceeds to step S505. Otherwise, the process exits from this flow.

In step S505, the control unit 101 selects the device to connect. The processing in this step corresponds to step S308 of FIG. 3. At the selection of the device to connect, the selection by the user operation is accepted in step S308. Alternatively, the device to connect may be determined by selecting the device satisfying a predetermined condition such as the firstly discovered device. In this example, it is assumed that the smart device 200 is selected.

In step S506, the control unit 101 selects the wipe shape for the device to connect. The processing in this step corresponds to step S309 of FIG. 3. In step S309, the selection by a user operation is accepted. Alternatively, the default wipe shape may be selected, or the wipe shape selected at the previous connection to the device to connect may be automatically selected.

In step S507, the control unit 101 performs a process for connecting with the smart device 200 as the device to connect selected in step S505. The processing in this step corresponds to steps S310 to S312 of FIG. 3.

In step S508, the control unit 101 determines the wipe shape. The processing in this step corresponds to step S313 of FIG. 3.

Figure 5B:
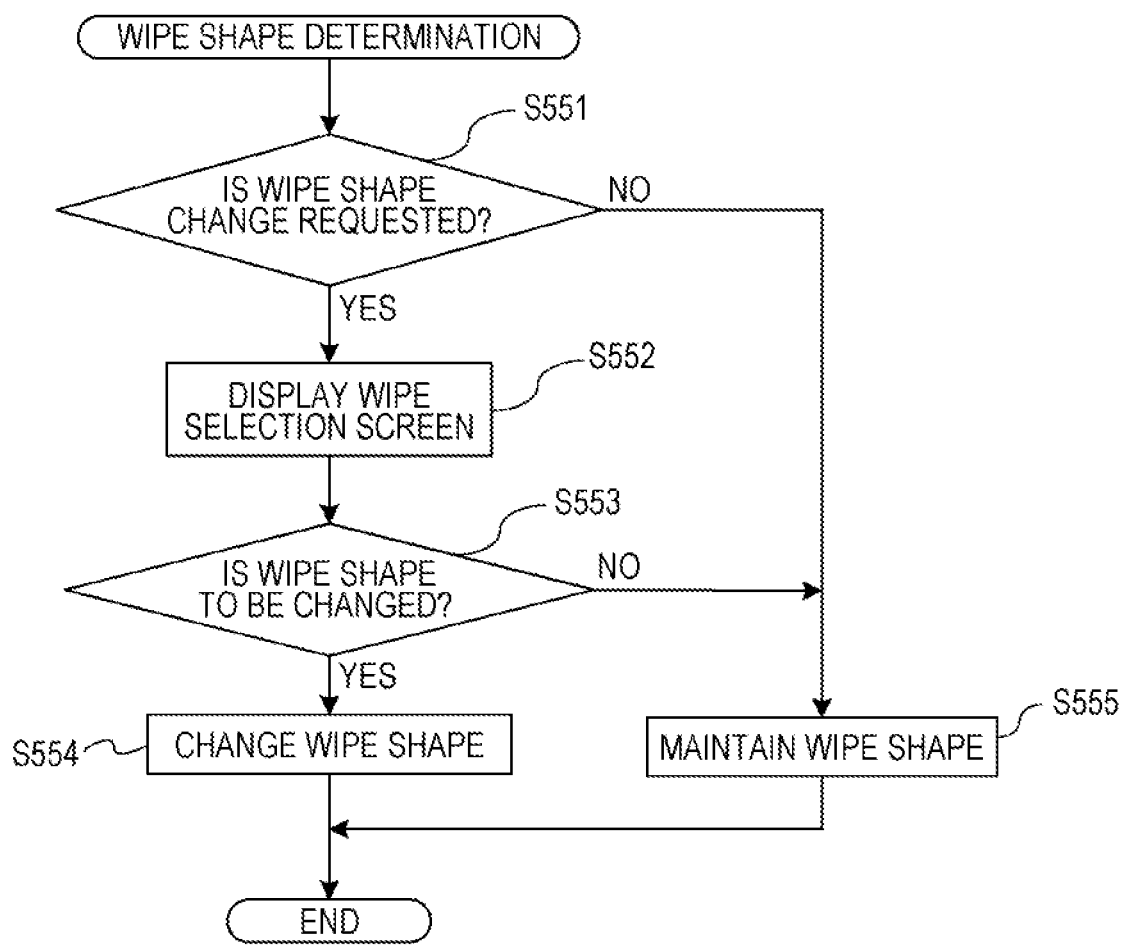
FIG. 5B is a flowchart describing details of a wipe shape determination processing according to the first exemplary embodiment.

The wipe shape determination processing in step S508 will be described in detail with reference to FIG. 5B.

In step S551, the control unit 101 determines whether there is a request for changing the wipe shape by a user operation. When the control unit 101 determines that there is a request for changing the wipe shape, the process proceeds to step S552. Otherwise, the process proceeds to step S555.

In step S552, the control unit 101 displays the wipe selection screen 404 illustrated in FIG. 4A on the display unit 106.

In step S553, the control unit 101 determines whether the wipe shape has been changed by a user operation. When the control unit 101 determines that the wipe shape has been changed, the process proceeds to step S554. Otherwise, the process proceeds to step S555.

In step S554, the control unit 101 determines to change the wipe shape. In step S555, the control unit 101 determines to maintain the wipe shape. Accordingly, the wipe shape determination processing is terminated.

Returning to FIG. 5A, in step S509, the control unit 101 transmits a sub image request including the notification of the wipe shape determined in step S508 to the smart device 200. The processing in this step corresponds to step S314 of FIG. 3.

In step S510, the control unit 101 receives sub image data from smart device 200 as a response to the sub image request transmitted to the smart device 200 in step S509. In this case, the sub image received here is an image in the wipe shape determined in step S508. The processing in step S510 corresponds to step S315 of FIG. 3.

In step S511, the control unit 101 combines the main image output from the imaging unit 102 and the sub image received in step S510. The processing in step S511 corresponds to step S316 of FIG. 3.

In step S512, the control unit 101 determines whether to terminate the process. Terminating the process refers to terminating the composition of the main image and the sub image, or powering off and shutting down the digital camera 100. When the control unit 101 determines not to terminate the process, the process returns to step S508. Otherwise, the process exits from this flow.

As described above, when the main image and the sub image are combined, the wipe shape of the sub image can be changed. In the present exemplary embodiment, in the digital camera 100, when the main image output from the imaging unit 102 and the sub image received from the smart device 200 are combined, the wipe shape is determined on the digital camera 100 side. The digital camera 100 notifies the smart device 200 of the wipe shape, and the smart device 200 transmits to the digital camera 100 the image data of the notified wipe shape as sub image data. As a result, it is possible to combine the main image and the sub image in the wipe shape desired by the user.

Second Exemplary Embodiment

Next, a second exemplary embodiment will be described. The configuration of a digital camera 100 is the same as that of the digital camera 100 according to the first exemplary embodiment, and descriptions thereof will be omitted. In the present exemplary embodiment, two smart devices A and B are taken, both of which are the same as the smart device 200 according to the first exemplary embodiment, and thus descriptions thereof will be omitted.

[About Image Composition]

A process of combining a main image output from an imaging unit 102, a sub image received from the smart device A, and a sub image received from the smart device B in the digital camera 100 will be described with reference to FIGS. 6 and 7.

FIG. 6 is a sequence diagram illustrating processing by the digital camera 100 and the smart devices A and B according to the second exemplary embodiment.

Figure 7A:
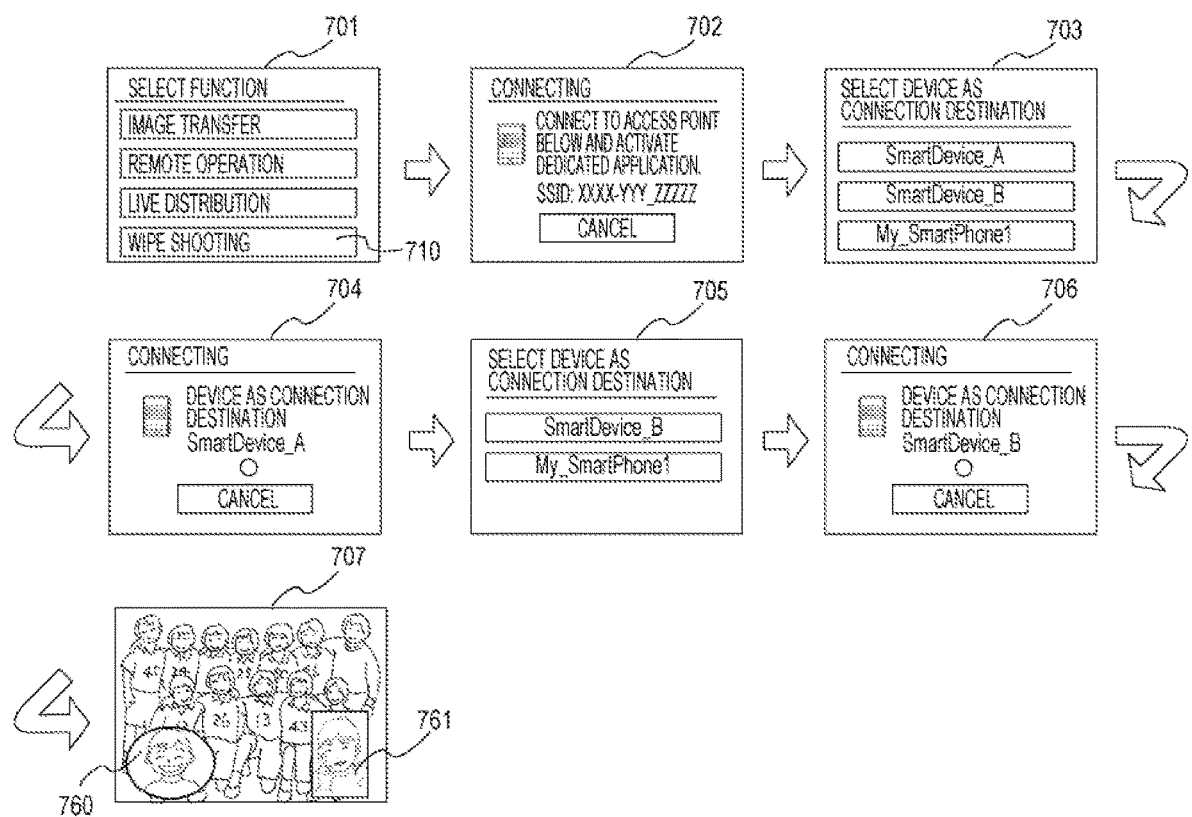
FIGS. 7A to 7C are diagrams illustrating examples of screens displayed on a display unit of the digital camera and a display unit of the smart device according to the second exemplary embodiment.
Figure 7B:
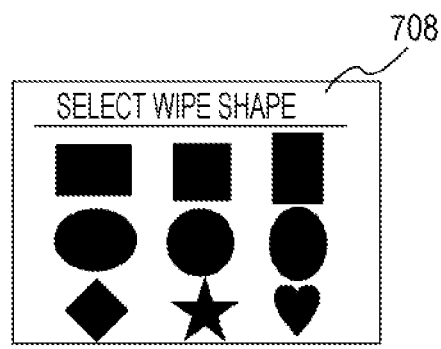
Figure 7C:
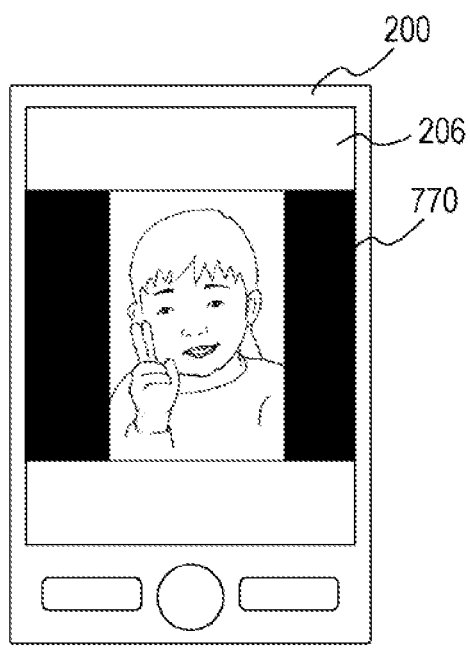

FIG. 7A illustrates an example of screen transition displayed on the display unit 106 when the main image output from the imaging unit 102, the sub image received from the smart device A, and the sub image received from the smart device B are combined in the digital camera 100. FIG. 7B is a diagram illustrating an example of a wipe selection screen 708 in the smart devices A and B. FIG. 7C is a diagram illustrating an example in which, in the smart devices A and B, a shooting screen 770 is set based on the determined wipe shape and is displayed on the display unit 206.

In step S601, as in step S301 of FIG. 3, the control unit 101 of the digital camera 100 displays a function selection screen 701 illustrated in FIG. 7A on the display unit 106. On the function selection screen 701, a wipe shooting button 710 for selecting the function of combining the main image and the sub image is displayed. The user can select the function of combining the main image and the sub image by operating the operation unit 105 (for example, the touch panel) and selecting the wipe shooting button 710.

Upon detecting the selection of the wipe shooting button 710, the control unit 101 starts the processing in step S602 and subsequent steps to perform a process for wireless LAN connection.

In step S602, as in step S302 of FIG. 3, the control unit 101 of the digital camera 100 activates the simple AP to generate a wireless LAN network and displays a screen 702 illustrated in FIG. 7A on the display unit 106.

In step S603, as in step S303 of FIG. 3, the control unit 101 of the digital camera 100 starts device search.

In step S604, as in step S304 of FIG. 3, the control unit 201 of the smart device A performs network selection.

When the network is selected by the user operation in step S604, the smart device A participates in the simple AP network of the digital camera 100 in step S605 as in step S305 of FIG. 3.

Then, a connection is established at an application level by the subsequent processing. In step S606, as in step S306 of FIG. 3, the control unit 201 of the smart device A receives an instruction for activation of an application saved in the non-volatile memory 203 via the operation unit 205.

In step S607, as in step S307 of FIG. 3, the control unit 201 of the smart device A broadcasts an advertisement notification to the participating network according to the control of the activated application to notify its own presence to the digital camera 100.

In steps S608 to S611, the smart device B also executes the same processing as in the steps S604 to S607.

In step S612, as in step S308 of FIG. 3, the control unit 101 of the digital camera 100 selects the device to connect. Upon reception of the advertisement notification in step S607 or step S611, the control unit 101 displays a screen 703 illustrated in FIG. 7A on the display unit 106. On the screen 703, the device names included in the advertisement notification are displayed to show a list of connectable devices to the user. The user can operate the operation unit 105 to select the device to connect from the screen 703. In the present example, it is assumed that the smart device A is selected.

In step S613, as in step S310 of FIG. 3, the control unit 101 of the digital camera 100 starts a process of connecting with the smart device A as the device to connect selected in step S612. In conjunction with this, the control unit 101 displays a screen 704 illustrated in FIG. 7A on the display unit 106.

In step S614, as in step S311 of FIG. 3, the control unit 201 of the smart device A notifies the digital camera 100 of whether connection is enabled or disabled.

In step S615, as in step S312 of FIG. 3, according to the notification in step S613, the application-level connection between the digital camera 100 and the smart device A is completed.

In step S616, for further connection with another external device, the control unit 101 of the digital camera 100 selects the device to connect as in step S612. The control unit 101 displays a screen 705 illustrated in FIG. 7A on the display unit 106. On the screen 705, the device names included in the advertisement notification are displayed to show a list of connectable devices to the user. On the screen 705, as compared with the screen 703, the device name of the smart device A already selected as the device to connect is deleted. The user can operate the operation unit 105 to select the device to connect from the screen 705. In this example, it is assumed that the smart device B is selected.

Steps S617 to S619 are the same as steps S613 to S615, and the application-level connection between the digital camera 100 and the smart device 13 is completed. When starting the process of connection with the smart device b, the control unit 101 displays a screen 706 illustrated in FIG. 7A on the display unit 106.

In step S620, the control unit 101 of the digital camera 100 transmits a sub image request to the smart device A.

In step S621, the control unit 101 of the digital camera 100 transmits the sub image request to the smart device B.

In step S622, the control unit 201 of the smart device A determines the wipe shape. When there is a request for changing the wipe shape by a user operation, the control unit 201 displays a wipe selection screen 708 illustrated in FIG. 79 on the display unit 206, so that the user can operate the operation unit 205 to select and determine the desired wipe shape. When there is no request for changing the wipe shape, the wipe shape at the present time is maintained.

In step S623, the control unit 201 of the smart device A transmits the sub image data to the digital camera 100. As illustrated in FIG. 7C, the control unit 201 sets a shooting screen 770 for shooting by the imaging unit 202 and displays the same on the display unit 206. On the shooting screen 770, an area for displaying the image captured by the imaging unit 202 is provided to match the wipe shape determined in step S622, and the other areas are blackened. In this example, a vertically long rectangular wipe at the upper right corner of the wipe selection screen 708 is determined. By setting the shooting screen according to the wipe shape in this way, the user can perform shooting with a consciousness about the wipe shape. Then, the control unit 201 transmits the image data output from the imaging unit 202 and adjusted based on the wipe shape as sub image data to the digital camera 100. Adjusting the image data based on the wipe shape refers to cutting out the image from the imaging unit 202 according to the wipe shape, for example.

In steps S624 and S625, the smart device B also executes the same processing as in the steps S622 and S623.

In step S626, the control unit 101 of the digital camera 100 combines the main image output from the imaging unit 102, the sub image received in step S623, and the sub image received in step S625. Accordingly, the display unit 106 of the digital camera 100 displays the composite image such that the sub image received from the smart device A is superimposed on the main image and displayed in a wipe 760, and the sub image received from the smart device B is superimposed on the main image and displayed in a wipe 761 as illustrated on a screen 707 in FIG. 7A. When shooting is performed in this state, the composite image data may be saved in the recording medium 110.

The digital camera 100 and the smart devices A and B repeatedly execute the processing in steps S622 to S626.

As described above, the main image output from the imaging unit 102, the sub image received from the smart device A, and the sub image received from the smart device B can be combined in the digital camera 100.

[Operations of the Digital Camera 100]

Next, the operations of the digital camera 100 for implementing the foregoing procedure will be described.

Figure 8:
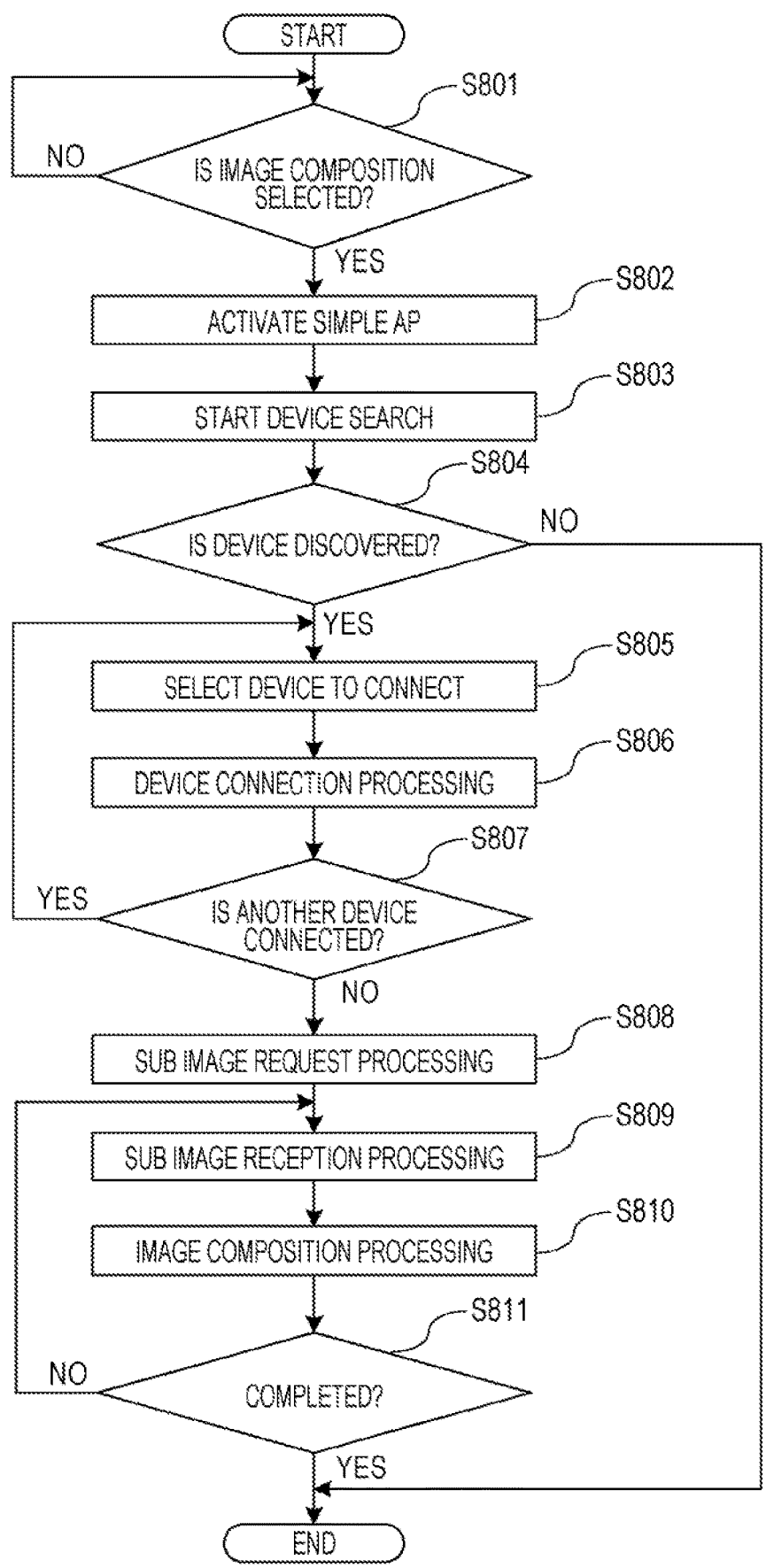
FIG. 8 is a flowchart describing the operations of the digital camera according to the second exemplary embodiment.

FIG. 8 is a flowchart describing the operations of the digital camera 100.

Steps S801 to S806 are the same as steps S501 to S505 and S507 of FIG. 5A, and descriptions thereof will be omitted here.

In step S807, the control unit 101 determines whether to perform connection to another external device. In this example, it is assumed that the digital camera 100 connects to the smart device A, and then connects to the smart device B. Whether to perform connection to another external device may be selected by a user operation, or the number of devices to be connected may be predetermined in advance, for example. When the control unit 101 determines to perform connection to another external device, the process returns to step S805. Otherwise, the process proceeds to step S808.

In step S808, the control unit 101 transmits a sub image request to the smart device A and the smart device B. The processing in this step corresponds to steps S620 and S621 of FIG. 6.

In step S809, the control unit 101 receives the sub image data from the smart device A and the smart device B as a response to the sub image request transmitted to the smart device A and the smart device B in step S808. The sub images received here are images in the wipe shapes determined in the smart device A and the smart device B. The processing in step S809 corresponds to steps S623 and S625 of FIG. 6.

In step S810, the control unit 101 combines the main image output from the imaging unit 102 and the sub images received in step S809. The processing in step S810 corresponds to step S626 of FIG. 6.

In step S811, the control unit 101 determines whether to terminate the process. Terminating the process refers to terminating the composition of the main image and the sub image, or powering off and shutting down the digital camera 100. When the control unit 101 determines not to terminate the process, the process returns to step S809. Otherwise, the process exits from this flow.

[Operations of the Smart Device 200]

Next, the operations of the smart device 200 (the smart devices A and B) for implementing the foregoing procedure will be described.

FIG. 9A is a flowchart describing the operations of the smart device 200.

In step S901, the control unit 201 determines whether a network has been selected by the user. The processing in this step corresponds to steps S604 and S608 of FIG. 6. When the control unit 201 determines that a network has been selected, the process proceeds to step S902. Otherwise, the control unit 201 waits until a network is selected.

In step S902, the control unit 201 participates in the wireless LAN network selected in step S901. The processing in this step corresponds to step S605 or S609 of FIG. 6.

In step S903, the control unit 201 determines whether the application has been activated by a user operation. The processing in this step corresponds to step S606 or S610 of FIG. 6. When the control unit 201 determines that the application has been activated, the process proceeds to step S904. Otherwise, the control unit 201 waits until the application is activated.

In step S904, the control unit 201 broadcasts an advertisement notification to the participating network according to the control of the activated application to notify its own presence to the digital camera 100. The processing in this step corresponds to step S607 or S611 of FIG. 6.

In step S905, the control unit 201 performs a process of connection with the digital camera 100. The processing in this step corresponds to steps S613 to S615 or steps S617 to S619 of FIG. 6.

In step S906, the control unit 201 receives a sub image request from the digital camera 100. The processing in this step corresponds to step S620 or S621 of FIG. 6.

In step S907, the control unit 201 determines the wipe shape. The processing in this step corresponds to step S622 or S624 of FIG. 6.

Figure 9B:
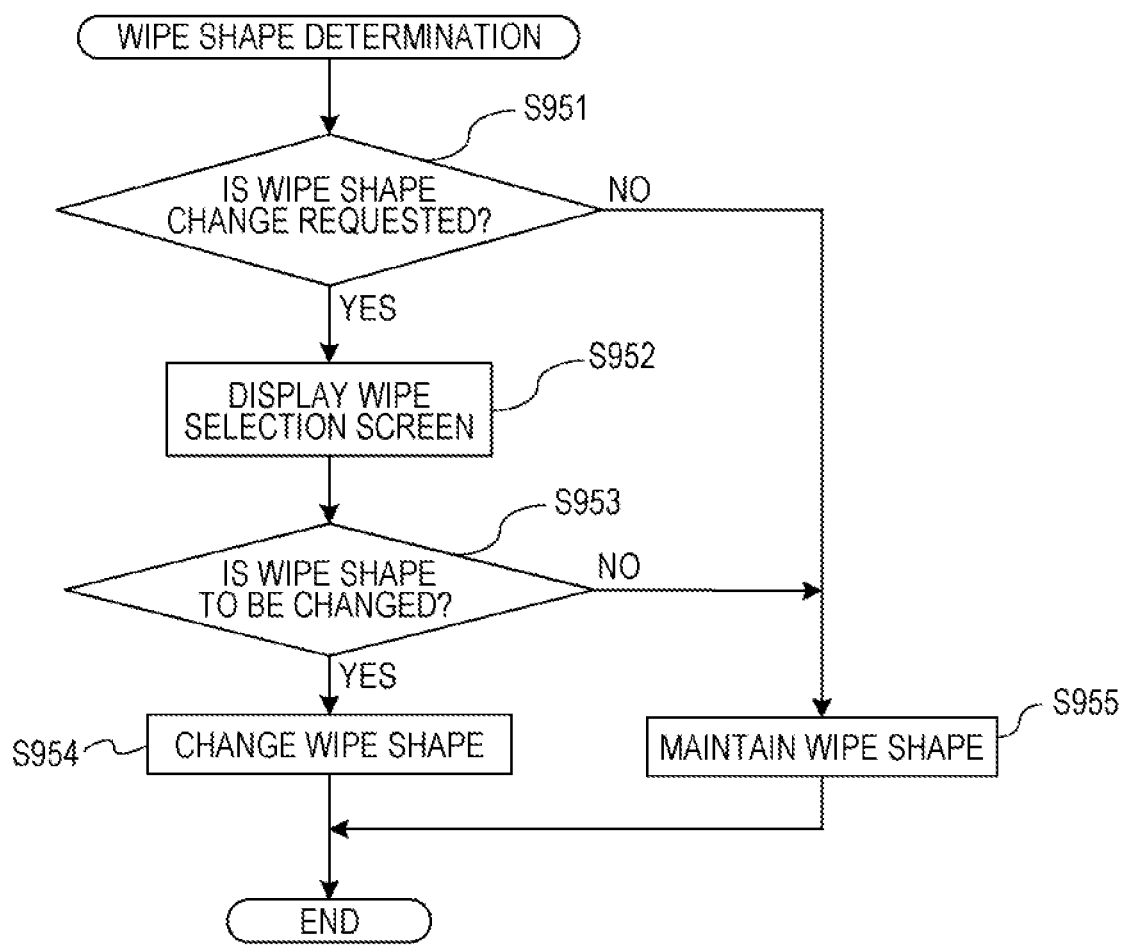
FIG. 9B is a flowchart describing details of a wipe shape determination processing according to the second exemplary embodiment.

The wipe shape determination processing in step S907 will be described in detail with reference to FIG. 9B.

In step S951, the control unit 201 determines whether there is a request for changing the wipe shape by a user operation. When the control unit 201 determines that there is a request for changing the wipe shape, the process proceeds to step S952. Otherwise, the process proceeds to step S955.

In step S952, the control unit 201 displays the wipe selection screen 708 illustrated in FIG. 7B on the display unit 206.

In step S953, the control unit 201 determines whether the wipe shape has been changed by a user operation. When the control unit 201 determines that the wipe shape has been changed, the process proceeds to step S954. Otherwise, the process proceeds to step S955.

In step S954, the control unit 201 determines to change the wipe shape. In step S955, the control unit 201 determines to maintain the wipe shape. Accordingly, the wipe shape determination processing is terminated.

Returning to the description of FIG. 9A, in step S908, the control unit 201 transmits the sub image data to the digital camera 100. The processing in this step corresponds to step S623 or S625 of FIG. 6.

In step S909, the control unit 201 determines whether to terminate the process. Terminating the process refers to terminating the composition of the main image and the sub image, or powering off and shutting down the smart device 200. When the control unit 201 determines not to terminate the process, the process returns to step S907. Otherwise, the process exits from this flow.

As described above, when the main image and the sub image are combined, the wipe shape of the sub image can be changed. In the present exemplary embodiment, in the digital camera 100, when the main image output from the imaging unit 102 and the sub image received from the smart device 200 (the smart devices A and B) are combined, the wipe shape is determined on the smart device 200 side. The smart device 200 transmits the image data on the wipe shape determined by itself as sub image data to the digital camera 100. As a result, the main image and the sub image can be combined in the wipe shape desired by the user.

In the first and second exemplary embodiments described above, the wipe shape can be changed. In addition thereto, the size of the wipe and the position of the wipe with respect to the main image may be changeable.

The above-described exemplary embodiments are merely examples and are not seen to be limiting. That is, aspects of the present disclosure can be carried out in various forms without departing from the technical idea or the main features thereof. In addition, the exemplary embodiments can be combined as appropriate.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium ay include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-086423, filed Apr. 27, 2018, which is hereby incorporated by reference herein in its entirety.

What is claimed is:

1. An image processing apparatus that communicates with an external device and combines a sub image received from the external device with a main image, the image processing apparatus comprising:
   one or more processors;
   wherein the one or more processors determine a wipe shape of the sub image, and wherein the one or more processors notify the external device of the determined wipe shape via an interface for communicating with the external device.

2. The image processing apparatus according to claim 1, wherein an image output from an imaging unit is set as the main image.

3. The image processing apparatus according to claim 1, wherein a plurality of wipe shapes are presented in a selectable manner and the one or more processors determine the wipe shape via a selection by a user operation.

4. The image processing apparatus according to claim 1, wherein the one or more processors notify the external device, via the interface, of the determined wipe shape by making a sub image request which includes a notification of the determined wipe shape.

5. An electronic device that communicates with an image processing apparatus that combines a sub image with a main image, the electronic device comprising:
   one or more processors;
   wherein the one or more processors receive a notification of a wipe shape of the sub image from the image processing apparatus via an interface for communicating with an external device, and
   wherein the one or more processors perform control such that data of the sub image to be combined with the main image by the image processing apparatus is transmitted to the image processing apparatus via the interface.

6. The electronic device according to claim 5, wherein an image output from an imaging unit is the sub image.

7. The electronic device according to claim 6, wherein the one or more processors set a shooting screen for shooting by the imaging unit based on the wipe shape of which notification is received via the interface.

8. The electronic device according to claim 6, wherein the one or more processors perform control such that the image output from the imaging unit is adjusted based on the received notification of wipe shape.

9. A control method of an image processing apparatus that communicates with an external device and combines a sub image received from the external device with a main image, the control method comprising:
   determining a wipe shape of the sub image; and
   notifying the external device of the determined wipe shape.

10. A control method of an electronic device that communicates with an image processing apparatus that combines a sub image with a main image, the control method comprising:
    receiving a notification of a wipe shape of the sub image from the image processing apparatus; and
    transmitting data of the sub image to be combined with the main image by the image processing apparatus, to the image processing apparatus.

11. A non-transitory computer-readable storage medium that stores a program for causing a computer to execute a control method of an image processing apparatus that communicates with an external device and combines a sub image received from the external device with a main image, the control method comprising:
    determining a wipe shape of the sub image; and
    notifying the external device of the determined wipe shape.

12. A non-transitory computer-readable storage medium storing a program for causing a computer to execute a control method of an electronic device that communicates with an image processing apparatus that combines a sub image with a main image, the control method comprising:
    receiving a notification of a wipe shape of the sub image from the image processing apparatus; and
    transmitting data of the sub image to be combined with the main image by the image processing apparatus, to the image processing apparatus.

13. The image processing apparatus according to claim 1, wherein the one or more processors perform control to receive an adjusted image based on the determined wipe shape as the sub image.

14. The image processing apparatus according to claim 13, further comprising an imaging unit;
    wherein the one or more processors combine the main image output from the imaging unit with the sub image.

15. The electronic device according to claim 5, wherein the one or more processors perform control such that the adjusted image is displayed on a display.

* * * * *